US010045238B2

(12) United States Patent
Scherzer et al.

(10) Patent No.: US 10,045,238 B2
(45) Date of Patent: Aug. 7, 2018

(54) PROVIDING EASY ACCESS TO RADIO NETWORKS

(71) Applicant: TruConnect Technologies, LLC, Los Angeles, CA (US)

(72) Inventors: Shimon Scherzer, Korazim (IL); Tamir Scherzer, Herzelia (IL); Ronnie Blaier, Herzelia (IL); Yariv Lifchuk, Rishon le Zion (IL); Michael Medvinsky, Natanya (IL)

(73) Assignee: TruConnect Technologies, LLC, Los Angeles, CA (US)

( * ) Notice: Subject to any disclaimer, the term of this patent is extended or adjusted under 35 U.S.C. 154(b) by 0 days.

(21) Appl. No.: 15/019,690

(22) Filed: Feb. 9, 2016

(65) Prior Publication Data
US 2016/0174089 A1 Jun. 16, 2016

Related U.S. Application Data

(63) Continuation of application No. 13/921,252, filed on Jun. 19, 2013, which is a continuation of application No. 13/188,723, filed on Jul. 22, 2011, now abandoned, which is a continuation of application No.
(Continued)

(51) Int. Cl.
| | |
|---|---|
| *H04W 4/00* | (2018.01) |
| *H04W 24/08* | (2009.01) |
| *H04W 72/02* | (2009.01) |
| *H04W 88/02* | (2009.01) |
| *H04W 24/10* | (2009.01) |
| *H04W 72/04* | (2009.01) |

(Continued)

(52) U.S. Cl.
CPC ........... *H04W 24/08* (2013.01); *H04W 24/10* (2013.01); *H04W 72/02* (2013.01); *H04W 72/04* (2013.01); *H04W 88/02* (2013.01); *H04W 48/16* (2013.01); *H04W 48/20* (2013.01); *H04W 72/0406* (2013.01)

(58) Field of Classification Search
None
See application file for complete search history.

(56) References Cited

U.S. PATENT DOCUMENTS

| | | | |
|---|---|---|---|
| 7,054,627 | B1 | 5/2006 | Hillman |
| 7,103,661 | B2 | 9/2006 | Klein |
| 7,236,798 | B2 | 6/2007 | Beuck |
| 7,266,595 | B1 | 9/2007 | Black et al. |
| 7,483,982 | B2 | 1/2009 | Dayton et al. |
| 7,940,731 | B2 | 5/2011 | Gao et al. |

(Continued)

OTHER PUBLICATIONS

European International Search Report for PCT/US2008/009011 dated Jan. 19, 2009.

*Primary Examiner* — Edan Orgad
*Assistant Examiner* — Sithu Ko
(74) *Attorney, Agent, or Firm* — Finnegan, Henderson, Farabow, Garrett & Dunner LLP (57) ABSTRACT

An improved connectivity to radio access point is enabled by a server that includes a database storing data about various radio access points, and an evaluation module evaluating the quality of connection to each of the access points. Clients receive updates about relevant access points from the server and use the information to connect to the preferred access point. The clients also check connectivity to other access points in the vicinity, and report the findings to the server. The server uses the reports to update its database, and send corresponding updates to the clients.

20 Claims, 2 Drawing Sheets

Related U.S. Application Data

11/743,853, filed on May 3, 2007, now Pat. No. 8,000,276.

(60) Provisional application No. 60/888,291, filed on Feb. 5, 2007.

(51) Int. Cl.
    *H04W 48/16* (2009.01)
    *H04W 48/20* (2009.01)

(56) References Cited

U.S. PATENT DOCUMENTS

| | | |
|---|---|---|
| 2004/0066759 A1 | 4/2004 | Lucchina et al. |
| 2004/0203890 A1 | 10/2004 | Karaoguz |
| 2005/0070279 A1 | 3/2005 | Fudim et al. |
| 2005/0083899 A1 | 4/2005 | Babbar |
| 2006/0002350 A1* | 1/2006 | Behroozi .............. H04W 36/30 370/338 |
| 2006/0094400 A1 | 5/2006 | Beachem et al. |
| 2006/0168438 A1 | 7/2006 | Klein |
| 2006/0171348 A1 | 8/2006 | Nakano |
| 2006/0217131 A1 | 9/2006 | Alizadeh-Shabdiz et al. |
| 2007/0004428 A1 | 1/2007 | Alizadeh-Shabdiz et al. |
| 2007/0019670 A1 | 1/2007 | Falardeau |
| 2007/0066304 A1 | 3/2007 | Lee |
| 2007/0167173 A1 | 7/2007 | Halcrow |
| 2007/0167174 A1* | 7/2007 | Halcrow .............. H04W 48/16 455/456.2 |
| 2007/0171881 A1 | 7/2007 | Midhani et al. |
| 2008/0013487 A1 | 1/2008 | Molteni et al. |
| 2010/0296441 A1 | 2/2010 | Barkan |

\* cited by examiner

PROVIDING EASY ACCESS TO RADIO NETWORKS

RELATED APPLICATIONS

This application is a continuation of pending U.S. patent application Ser. No. 13/921,252, filed Jun. 19, 2013, pending, which is a continuation of U.S. patent application Ser. No. 13/188,723, filed Jul. 22, 2011, abandoned, which is a continuation of U.S. patent application Ser. No. 11/743,853, filed May 3, 2007, issued as U.S. Pat. No. 8,000,276, which claims priority from U.S. Provisional Application No. 60/888,291, filed Feb. 5, 2007, all of which are incorporated herein by reference.

BACKGROUND

1. Field of the Invention

The subject invention relates to wireless services and wireless access points.

2. Related Art

Various broadband wireless services are commonly used by users of computers, PDA's, phones, etc. Broadband wireless services are commonplace in homes, offices, and other public establishments, such as restaurants, airports, etc. Emerging new applications (portable games, PDAs, WiFi and dual mode phones etc.) raise the need for broadband wireless connectivity on demand and at any location. Additionally, newly developed content applications enrich the user's experience, provided that the user is able to easily access broadband network wirelessly. Examples of such content applications include:

User generated content such as pictures and video (e.g., YouTube, Yahoo etc.);

Video and audio streaming over the Internet;

Video games (e.g., Sony PSP, Nintendo DS); and,

Location awareness applications (e.g., Google Earth, Microsoft Virtual earth etc.).

At present, the availability of broadband wireless connectivity (WiFi) is on the rise thanks to various free radio connections enablers, such as:

Business guest networks, e.g., open networks provided in restaurants, coffee shops, etc.

Office guest networks, e.g., open networks provide in corporations, professional offices, etc.

Municipal networks, e.g., various geographical area networks established by companies such as Cloud, Google, Metrofi etc.

Public Facilities networks, e.g., networks established in conferences, shows, etc. and, Private home networks, e.g., unsecured AP's (access points), sharing AP's etc., which may have reception range beyond the particular home installing the network.

The common denominator for all these broadband connection opportunities is mediocre service due to, e.g.:

Asymmetry between down and uplink: terminal may not be able to communicate the AP although it can perfectly hear it.

Lack of standardization, which often results in connection failures (802.11 specifies only a fraction of the actual connection process);

In many cases the large quantity of WiFi radio resources produces "clutter" that makes finding an accessible source very difficult ("needle in haystack");

Switching between networks is a very slow process due to the network parameters setup (IP address, DNS). When operating in heterogeneous environment that necessitate high rate of AP switching this could be a big issue;

Connection operations may be complex and cumbersome (security management, captive portals etc.); and, Poor geographical coverage due to insufficient radio resources density.

Consequently wireless broadband access using currently available tools still requires substantial amount of patience and expertise. Furthermore, outdoor (i.e., not home or office) operation can become very unsatisfactory. Current solutions aiming to improve the broadband access experience focus mainly on two issues: addressing the "where to find a connection" challenge and automating the connection process. For example, WiFi resources (hot-spots) maps are available through various websites (JiWire, Microsoft, etc.) to enable users to locate AP's. Laptop and WiFi enabled handheld terminals vendors are integrating better WiFi clients (in addition to Windows WZC (wireless zero configuration) service) that may reduce the user intervention in attempting to connect to an AP. For example, one method caches the last used radio connections, so that the cached information can be used in future connection attempts.

However, there is still a need in the art for a single integrated connection facility that enables easy and fast identification and connection to an AP. A system is needed that would require little, if any, user intervention and that its operations be transparent to the user.

SUMMARY

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below;

Various embodiments of the subject invention provide method and apparatus that combines radio resource map, clutter management, and connection automation. The inventive method and system require minimal, if any, user intervention and operate in a manner that is transparent to the user. Embodiments of the invention may be effectively implemented as network overlay, thereby providing efficient service over the Internet.

According to an aspect of the invention, a server includes a database storing data about various radio access points, and an evaluation module evaluating the quality of connection to each of the access points. Clients receive updates about relevant access points from the server and use the information to connect to the preferred access point. The clients also check connectivity to other access points in the vicinity, and report the findings to the server. The server uses the reports to update its database, and send corresponding updates to the clients.

According to aspects of the invention, a method for connecting a wireless user terminal to an Internet is disclosed, comprising: generating first set of data by using the user terminal to analyze radio resources in reach; obtaining a second set of data generated by at least one other terminal analyzing radio resources in reach; generating a third set of data from the second set of data; and combining the first and third sets of data to select preferred radio resource for connection. In the method, for each radio source, the first set of data may comprise at least one of:

i. Network name;
ii. MAC address;
iii. Received signal strength and variance over time;
iv. Encryption status;
v. Internet connection available capacity;
vi. Access protocol response times;
vii. Gateway IP address;
viii. DNS address;
ix. Occupied IP addresses;
x. Captive portal credentials;
xi. Connection Technology.

The third set of data may comprise at least one of:
i. Location
ii. Internet accessibility
iii. Long term behavioral statistics comprising:
   Percentage of availability
   Signal strength variance
   Available bandwidth
iv. Name of owner;
v. Owner profile;
vi. Password.

In the method, selecting the preferred radio resource may comprise analyzing at least one of:
   encryption status;
   backhaul performance;
   knowledge of password;
   amount of bandwidth allocated by owner for visitors; and
   number of visitors connected to the radio resource.

The method may further comprise transmitting the first set of data to a service server over the Internet. The method may further comprise transmitting the third set of data from the service server to the user terminal. The method may further comprise sending an update to the third set of data whenever the user terminal connects to the Internet. The method may further comprise updating the third set of data upon receiving a subsequent one of the first and second sets of data.

According to other aspects of the invention, a method for enhancing connectivity to radio access points is provided, comprising: providing a plurality of clients operating on a plurality of mobile devices; receiving connectivity reports from each of said plurality of clients; constructing access database from said plurality of reports; and transmitting selected data from said database to each of said clients. The selected data for each of the clients may correspond to access points in a geographical proximity to the corresponding client. The selected data for a corresponding client may correspond to access points in a vicinity of a geographical location indicated by the corresponding client. The connectivity report may comprise cache data of an access point. The selected data may comprise cache data of an access point.

According to yet other aspects of the invention, a method for enhancing connectivity to radio access points is provided, comprising: operating a mobile device to connect to a network access point; receiving access point data from the network access point; storing the access point data so as to generate cached data; and sending the cache data to a central server. The method may further comprise receiving from the server third party cache data, wherein the third party cached data comprises access point data obtained from another mobile device. The cached data may comprise name and MAC address of the network access point.

According to further aspects of the invention, a system for enhancing connectivity to radio access points is provided, comprising: a connectivity database; an evaluation module receiving connectivity reports from a plurality of clients and storing the reports in the connectivity database, said connectivity reports comprise data relating to radio access points to which the clients attempted to connect; and a processor sending updates to each of the clients, said updates comprising selected data from the database, said selected data relates to access points in a selected geographical region. The selected geographical region may comprise a locale in which each client is present. The selected geographical region may comprise a locale indicated by each client.

According to further aspects of the invention, a method for operating a mobile device for enhancing connectivity to radio access points is provided, comprising: searching for radio signals of access points; attempting to connect to at least one of the access points; upon successful connection storing access points data to thereby generate cached data; and sending the cached data to a remote server. The method may further comprise monitoring radio transmission activity of the mobile device; when a lull in the radio transmission activity is detected, performing: breaking the connection to the access point; connecting to another access point; storing another access point data to thereby generate another cached data; and sending the another cached data to a remote server. The method may further comprise receiving third party cached date from the remote server, and storing the third party cached data in the mobile device.

According to further aspects of the invention, a method for improving wireless connectivity to the Internet by utilizing a social network ism provided, comprising: instituting a plurality of user accounts having corresponding usernames, each account corresponding to one user of a plurality of users; receiving user connectivity reports from users, each connectivity report comprising at least access point name, access point location, and access point status; maintaining a list of access points, and listing usernames of all users who send a connectivity report for the respective access point; and providing a user interface comprising the listing of usernames and a map having indicators for access points name, location, and status. The access point status may comprise one of open, locked, and requiring sign in. The method may further comprise; for each username maintaining a log of the connectivity reports sent by that user.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Various embodiments of the invention provide methods and systems for enhancing broadband access experience. The inventive method and system utilize knowledge base about existing AP's to provide better decisions and connection to AP's, and utilizes users experience to update the knowledge base. For example, in densely populated cities it is common that many radio access points are listed on a laptop's wireless network connections screen. However, as is well know, just because a radio access point is listed on the screen and shows several bars of reception strength doesn't mean that the access point is available for connection. That is, even if the access point is listed as unsecured, the laptop may still be unable to connect to that AP. To make matters worse, it is not possible to know beforehand whether the AP is available for connection or not. Consequently, at present time the only way to determine which AP is available is to try to connect to each one listed until one successfully connects. Such a reiterative process is cumbersome, especially in densely populated areas, and requires certain level of expertise in operating a laptop or other wireless mobile device. Such problems are elegantly solved by various embodiments of the invention, as illustrated below.

According to various embodiments of the invention, methods and apparatus are provided that closely integrate historical data discovered by users' community (such as WiFi "hot-spots" locations and quality), with real time data acquired by individual users. Each user's device executes a program (e.g., a client) that uses the combined data to find usable radio resources and establish Internet connection through them. The system employs client/server architecture: each user operates a radio client that, besides connecting to the radio network, executes radio measurements and report to the network server that shares this information with other user's clients. Since each user's client knows most of the network parameters (ahead of connection to a new network), the client may spend much less time determining these parameters; hence the connection process can be substantially expedited. For example, executing WiFi connection to the Internet requires sequence of steps stating with 802.11 association, continuing with security exchange, essential network IP information acquisition and accessing specific network location. If some of the connection related information is already available at the association stage, part of the other steps can be eliminated and consequently faster and higher quality Internet access can be achieved. Additionally, faster and reliable connection can provide for seamless connection switching (roaming) between different radio resources.

Figures 1, 2:
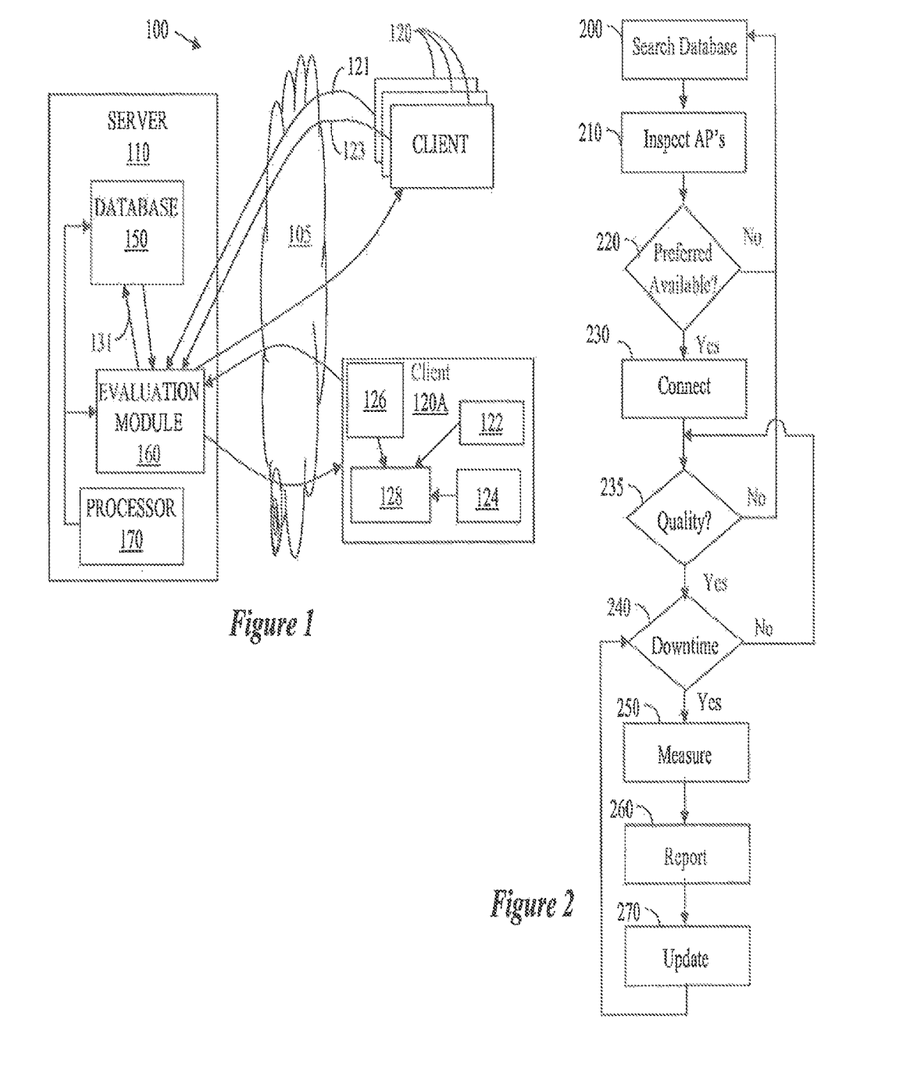
FIG. 1 is a general schematic illustrating system layout according to an embodiment of the invention.
FIG. 2 is a flow chart illustrating a method to be executed by a client, according to an embodiment of the invention.

FIG. 1 is a general schematic illustrating a system layout according to an embodiment of the invention. In FIG. 1, various clients 120 and 120A communicate with server 110 via network 105, such as the Internet. Client 120A may be any of clients 120, and is provided to show greater details of various elements of clients 120. Server 110 includes database 150, which stores historical data about radio broadband access resources. Server 110 also includes an evaluation module 160, which evaluates accessibility and bandwidth of various AP's, and stored the information as an update in database 110, as shown by arrow 131. A processor 170 controls the operations of the database 150 and evaluation module 160, and communication with the clients 120.

Updates in the form of connectivity reports are sent to server 110 from each of the clients 120, as shown by arrows 121, 123. The updates include data collected when each client attempts to connect to an access point. Certain elements of clients 120 are depicted in exemplary client 120A. As shown in FIG. 1, according to this embodiment, client 120A comprises a credentials module 122, a local database 124, fast varying data module 126, and connection decision module 128. The functionality of these elements will be described below with respect to a method implemented according to an embodiment of the invention.

FIG. 2 is a flow chart illustrating a method to be executed by a client, according to an embodiment of the invention. While the steps illustrated in FIG. 2 and described herein are in certain order, it should be appreciated that the various steps may be performed in a different order. In order to connect to a broadband network, in Step 200 the client 120A queries its local database 126 to obtain the best available AP for the particular location the clients is located at. At Step 210 the client inspects all available radio signals in the area. Then, at Step 220 the client checks whether the preferred AP for that location is available. If not, the next best AP is selected and again it is checked whether that one is available, and so on, until at Step 230 the client connects to an AP.

While the client device is connected, at Step 235 the device checks the quality of the connection. If the connection is below a set quality threshold, the system reverts to Step 200 to select another service. According to embodiments of the invention, quality of connection may also take into account bandwidth loading. For example, in situations where many AP's are available and many users are present, it often happens that most users use one specific AP, e.g., the first listed AP. Consequently, one AP may experience high load, while others low load. Therefore, it may be the case that one AP may have lower radio reception strength, but be very lightly loaded so that it would be preferable to choose such an AP over one with high reception strength, but which is heavily loaded. The client according to the embodiment of the invention therefore checks load in addition to other connection quality parameters. If the connection quality is acceptable, at Step 240 the client checks whether the device is in downtime, i.e., there is a lull in communication between the device and the network. If so, at Step 250 the client measures parameters of other available AP's and at Step 260 the client reports the measurements to the server 110. At Step 270 the client receives an update from server 110, which may includes data obtained from other clients and sent to the server 110, and use that update to update its local database 126.

The server 110, on the other hand, continuously receives measurements from various clients that are connected to access points. The server 110 uses the measurements from the clients to update the database 150. In this manner, the database 150 is enhanced and continuously updated to include up to date data on any AP's that were newly put to service, modified, or removed from service. This data is sent to the clients so as to update each client's database. However, in order to conserve resources, according to one embodiment, only data relating to AP's in the client's general neighborhood is sent. According to another embodiment the user can indicate for which geographical area the user wishes to obtain updates. In this manner, for example, if the user intends to take a trip to a different location, the client can request an update of available AP's at the destination location beforehand. Similarly, if the user continuously commute between two or more locations, the user may request constant updates for these indicated locations.

As can be seen from the above, according to the embodiment of the invention, individual user's clients exploit gaps in traffic communication to execute radio measurements on radio resources (ex. WiFi access points) in their neighborhood (i.e., resources "in reach") to evaluate their ability to provide broadband access. According to one particular embodiment, this evaluation goes way beyond the normal RSSI/security evaluation done by typical WiFi clients. Specific example of such evaluation will be provided further below. The client's measurements reports are relayed to network server, so that the historical radio resources database (i.e., slow varying data) is gradually expanded and updated at the network server.

When clients send new measurement data, the clients' reports and historical radio resources data are used by the evaluation module 260 to determine quality and accessibility of radio resources. This determined data is selectively transferred to individual clients. The clients use this data to update their local radio resources database 126, so as to enable selecting the best radio resource available and executing quick connection. That is, as will be described below, the connection process is expedited by reducing the number of connection steps. As can be understood, as users connections number and quality increases, more reports are generated, thereby leading to further improvement in radio connections. As a result of this process, clients are able to:
a) Establish control signaling with network servers;
b) Allow individual client to select the best radio connection;
c) Facilitate quick and reliable connection through predetermined connection parameters;
d) Provide an updated radio resources geographical map with connection likelihood. This map could be displayed on a laptop, PDA, cell-phone, etc., upon request; and,
e) If current connection quality gets below minimum level, automatically switch connection to a better radio resource. In most cases, connection is established without any user intervention: once user initiates a network-based application (e.g., access to websites, playing games through the web, using IM, sharing files, making IP call, etc.), the system executes automatic Internet connection (AutoConnect). The automatic connection can be implemented by continuously or periodically executing the loop of Step 235 of FIG. 2. The user may also access the connection facility manually through an application control window.

According to embodiments of the invention, network clients continuously collect radio resources information. These clients could be executing on laptops, handheld devices (PDA's), cellphones, or any other devices that incorporate radio facility, such as WiFi. For example, laptop based clients can conduct radio survey while the laptop is on. Handheld units can execute this function either while activated for Internet use or while idle (i.e., in the user's pocket). Each active user terminal should be able to conduct radio resources' survey whenever it is in use. This is achieved by "measurement trips": the client is directed to associate with an AP other than the one used for current Internet connection, and conduct data acquisition as described below. These "trips" are executed while no time-sensitive traffic is performed, so as to avoid degradation of the user's experience, as described below.

Notably, the actual rate of measurement trips per user needed decreases as the user population grows. For example, if only one user is present at a given geographical area, but several radio resources are available, a relatively large number of trips would be required to provide sufficient data to properly characterize all of the available radio resources. On the other hand, if one hundred users are present in that geographical location, it may be sufficient for each client to perform only a single trip, which from the sever perspective would amount to one hundred trips.

According to an embodiment of the invention, the following parameters are collected and reported by clients as a result of a "measurement trip":
  Backhaul quality (estimated bandwidth connection to Internet);
  Gateway and DNS IP addresses;
  Captive portal status (i.e., does AP have captive portal?);
  AP security status (e.g., free, WEP, WPA, WPAII); and,
  Estimated location (i.e., when the client determined its own location).

The above information is tagged by information acquired as part of the standard 802.11 scan, i.e.:
  Network name (SSID—service set identifier); and,
  Radio MAC address.

According to embodiments of the invention, in order to acquire the radio resources parameters, each trip includes either complete or partial wireless Internet connection. The measurement/connection process may incorporate up to six phases, or any combination thereof:

F1—Basic 802.11 association procedure (inclusive of WEP, if needed); either using beacon information or probing to get association information. Being short duration this operation may be repeated frequently. The rate of successful associations provides a good indication of signal quality and radio interference.

F1.5—Once F1 is successful, static IP is selected for higher layers (OS, applications) as described in previous patent application U.S. Ser. No. 11/634,414, filed on Dec. 8, 2006, and entitled "Masking Changes for Seamless Roaming in Heterogeneous Networking," which is incorporated herein by reference in its entirety. In response to this assignment the OS generates an ARP (address resolution protocol) and waits until the ARP response. This phase may take a hundred of milliseconds.

F2—802.11 authentications; (WPA, WPA2 . . . ). Authentication is normally time consuming and with high duration variability. This phase may last few seconds (depend on AP firmware implementation).

F3—DHCP (Dynamic Host Configuration Protocol)—discovery operation to provide the network gateway (GW) IP address, subnet mask values and optional DNS address. GW value is essential for generation of appropriate static IP address to allow Internet access (IP value must be selected within the space defined by the GW IP address and its associated mask). DNS value may be essential but could be obtained by other means.

F4—Obtain static IP value. This LP value is exposed to the network and not to the higher layers above. This IP value is verified by generating an ARP (with the selected IP address) on the host network. In addition, another ARP with gateway address is generated to update the OS ARP table.

F4.5—This stage includes three steps:
  Send ping with "time to leave" (TTL) equal 3. This ping will test response of the subnct gateway and the next two network nodes behind it (upstream). If all pings are responded, Internet connection is verified.
  HTITP request to network server is generated to discover captive portal: if a captive portal exists, the HTTP message will be "hijacked" and re-direction indication status destination is returned.
  UPDP (Universal Packet Driver Protocol) frame is transmitted through ports 53 and 80 to a dedicated server to check Internet connectivity. Transmission success is evaluated after returning to the active connection and asking the server ("cache server") if the message properly arrived.

F5—Setting firewall status and allowed bandwidth consumption. Firewall can be set to one of three states:
  Block everything (status=0)
  Allow Internet access only (status=1); normally used by visitor firewall to prevent access to shared AP subnet resources (printer, etc.).
  Allow access to Internet and subnet (status=2); normally used by AP owner allowing access to subnet resources.

The success/failure of the "F" steps and actual duration times required to accomplish each of the "F" steps is combined in "F-timing vector". This information can be used to characterize an access point's behavior.

The radio resource database 150 stores data on all radio access points (WiFi and others) that have been discovered or registered by the users community. User's client may access this information as necessary to:

Review potential wireless Internet connection resources on geographical presentation (map, aerial photos, etc.);

Select local usable wireless connections out of 802.11 scan results.

The above information is used to build and expand the radio resource database 150. The database 150 includes list of APs reported during previous scans, measurement trips, and user AP registration (user registering an AP can set the percentage bandwidth that can be shared). Each database entry is indexed by SSITD and MAC address and may include:

Backhaul quality (estimated bandwidth connection to Internet);

Gateway and DNS IP addresses;

Captive portal status (i.e., does the AP have captive portal)

AP security status (e.g., free, WEP, WPA, WPAII);

Estimated location (when the client determined its own location);

"F1" to "F5" success rate;

"F1" to "F5" average execution periods; and,

Percentage allowable shared bandwidth.

According to one embodiment of the invention, each report is also time stamped. Time stamping can assist in ensuring that data sent to clients is based on currently reliable information. For example, a time period may be established after which a report received from a client is discarded. Alternatively or in addition, a weighted system may be established so that the importance of a report diminishes with time, and most recent reports from a client get the highest credence.

The process of wireless connection to Internet can be substantially shortened when user terminal "knows" connection information before a connection attempt is executed. For example, when the terminal knows which of multiple APs has a good backhaul it can select the right AP for connection, thereby avoiding connection testing and "retries". If the terminal knows what IP address will be acceptable while connecting to a specific network, DHCP (Dynamic Host Configuration Protocol) process can be avoided thereby saving substantial amount of time. For each connection procedure, the client may execute all or part of the listed "F" steps". In a standard system (ex. Windows) all "F" steps must be performed since no information regarding accessed network is known beforehand (safe assumption for distributed network with independent clients). Sharing centralized radio resource information with each client allows shortcuts: the more information is known to clients about the selected access point, the number of "F" steps can be reduced, hence connection time minimized. Typically, when the AP is already part of radio resource database, only F1 (association), F2 (WPA exchange) and F4 are needed, thereby substantially reducing the average connection time. When the number of users increases, F4 can be shorten as well (eliminate ARP function). Reduced connection time allows seamless connection switching (roaming) without centralized control.

To illustrate, it is well known in current computing system to cache information related to access point to which the mobile device has connected before. In this manner, when the mobile device is activated at a later time in the same locale, the system uses the information in the cache to automatically reconnect to that AP. The cache normally includes the name and the MAC address of the AP. However, when the mobile device is activated in a new location, it has no information in the cache to enable fast connection to an AP. According to an embodiment of the invention, when clients send connection reports they also send the cache information. Then, the server sends cache information to each client, relating to all AP in the vicinity of the client or in a geographical area requested by the client. In this manner, the mobile device can have cache information of AP's to which the mobile device was not connected before. Thus, for example, if a user travels to a new location, the user can indicate the travel destination and the server would download cache information relating to AP's at that geographical location. Then, when the user reaches that location, its mobile device can use the information in the cache to easily connect to AP's in the destination location.

To expedite wireless Internet access, radio resource information that has been accumulated and processed at the network server must be distributed to user terminals (clients). According to an embodiment of the invention, the distribution to clients is made of only information that is relevant to each specific client. According to one specific example, relevant radio resource information is distributed based on the client's geographical location. The client's geographical location is defined as the location last Internet connection had been established; e.g., home, office, free hotspot etc. The network can determine clients location using few alternate methods, most notably IP location services. IP location service can locate the client to city, neighborhood etc. Hence relevant radio resource information may be relevant to same city or neighborhood. Although this approach may not be sufficient when the client is relocated between cities, client's autonomous connection capability can establish first connection in a new place and facilitate first radio resource information distribution. Thereafter, the client executes the processes described herein to obtain data about radio resources in that specific geographical location. Additionally, as described above, the user may indicate a specific geographical location for AP update.

Connecting to wireless network starts by scanning the neighborhood for candidate connections (802.11 scan). The 802.11 scan produces a list of access points in reach; for each intercepted access point radio signal strength indication (RSSI) is provided along with type of security status. The connection process will exploit the radio resource information in its memory. Next, the client selects the most favorable access point for connection in the following order:

If "favorite" AP (AP is called favorite if it is part of radio resource database that had been distributed to client, or user manually added it to the favorite list) is detected by "802.11 scan" and the RSSI is above predetermined threshold (ex. Owner's AP), the client selects this AP for connection, or If a list of previously successfully used access points is available (locally stored) and some APs out of the list are available and their RSSI is above predetermined threshold, client will select the highest RSSI value-AP out of the list for connection, or If an one or more APs that are registered as collaborating APs are present and their RSSI is above predetermined threshold, client will select the one with highest RSSI, or If only free (non-secured) APs are present and their RSSI is above predetermined threshold, the client will select the highest RSSI AP first and if connection cannot be made, will select the next highest RSSI AP and so on, until connected.

If only captive portal APs are present and captive portal parameters their RSSI is above predetermined threshold, select the AP with highest RSSI and connect.

If after the above process no connection is achieved, client declares "no connection possible".

As mentioned above, the connection process (F1 to F5) is being shortened as much as possible depending on whether radio resource information regarding the target AP is already known.

As described above, procedure F4.5 allows identification of captive portal existence. When user tries to access a captive portal for the first time, his request for specific site (normally through browser launch) is hijacked and a captive portal page is presented. The user then must enter various information elements as prompted by the captive portal page. This session can be recorded by the client and cached for future connections to same portal. When the device tries to connect to the same portal again, the client can automatically carry the session. This action relives the user from the need to handle lengthy interaction with the portal when connecting. Sometimes not all information transactions can be automated (ex. CAPTCHA verification by typing distorted letters). In this case, some user interaction (entering some data) may be needed. In addition, the session details can be sent to the network server to be cached for other users in network server's captive portal database. For each captive portal name a transaction script is stored. A localized version of this database exists at the client as well. The client's database contains a fraction of the network server's database: captive portal that are in its neighborhood. When a user is connected to Internet, its local captive portal database scripts is getting updated based on its speculated neighborhood. The speculated neighborhood is determined based on the location of the current Internet connection. The user, however, can update its captive portal database manually by defining the desired neighborhood.

The network server uses the clients' reports to determine AP accessibility and potential service quality. The AP Quality and accessibility (Q&A) vector is encoded into radio resource database entries. It is essential to make this information very concise to minimize the traffic load when updating the clients' local radio resources database. These entries are stored at the network server database 150 based on location coordinates sorted to "wireless regions." Radio resources regions are geographical areas such as cities, parks, groups of cities, states and other geographical areas of interest. The radio resources are sorted to these regions based on location coordinates reported by the clients (ex. IP location method). Obviously the regions' sizes can vary dramatically. The number of regions can change over time to reflect radio resources distribution and other factors. APs are sorted by MAC address and/or SSID. Combining SSID and MAC address provides a more robust (unique) indexing. Each AP's Q&A vector includes as follows:

Connection Quality;
Ease of Accessibility;
Gateway IP & mask;
Time Stamp (optional); and,
Location coordinates (optional).

Connection quality may be calculated based on first and second order statistics of ping delay, RSSI, achieved data rate (over all clients' reports):

$$ConnectionQuality = Q \cdot \frac{\mathrm{mean}(RSSI) \cdot \mathrm{mean}(dataRate)}{\mathrm{var}(pingDelay) \cdot \mathrm{var}(dataRate) \cdot \mathrm{mean}(pingDelay)}$$

Accessibility is defined in two stages:
Accessible/non-accessible; and,
If accessible, "ease of accessibility" is calculated based on statistics of: success of F operations rate and F-timing vector value (over all clients' reports) weighted by security status and availability of password.

$$\text{Ease of Accessibility} = A^*(\text{Connection Success Rate}/\text{Mean (Connection Time)})$$

Upon first time login, selected region of radio resources database (based on client's estimated or reported location) is downloaded into the client. This information can be downloaded in sections starting with immediate neighborhood region and gradually (as time permitted) larger regions. Client radio resource database may be updated when:

AP in server database section (region) that is relevant to current client's location has changed by more than a certain update threshold since last update. To minimize traffic it is beneficial to load only the changes since last update.

The client moved to a different radio resources database region.

The client's database is empty or has been erased.

The client has requested an update.

When client is becoming active it executes 802.11 scan (for APs in reach: RSSI, security status). Using the MAC address the client can compare this scan results with its radio resources database to determine which APs are preferred for connection and roaming.

Figure 3:
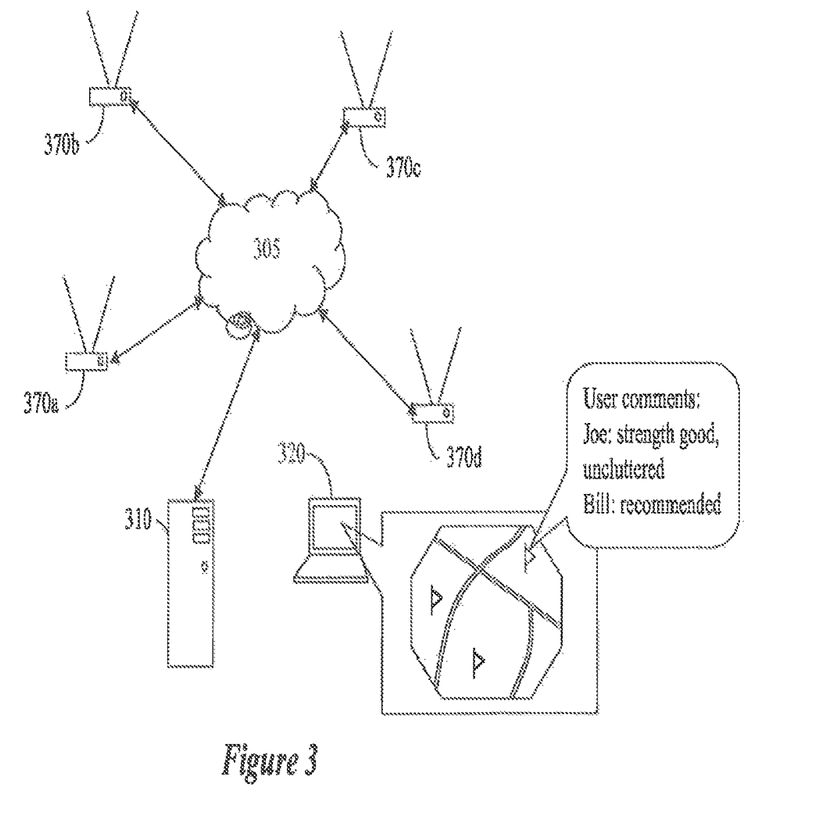
FIG. 3 is a schematic illustrating a social network according to an embodiment of the invention.

According to an aspect of the invention, the access method and apparatus cam be implemented as a social network. One issue observed by the inventor is that generally owners of radio access points are averse to sharing the AP resource with people they don't know. However, if there has been certain a priory contact, owners are much more likely to share the resource. Such an a priory contact may be made in the form of a social network. FIG. 3 is a schematic illustrating a social network according to an embodiment of the invention. In FIG. 3, a computing resource, such as server 310, and radio access points 370*a-d* are connected to a network 305, such as the Internet. In this embodiment, access point 370*d* belongs to a user who also uses access device 320, such as a laptop, a PDA, etc. The user generally is able to access the Internet 305 by connecting device 320 to access point 370*d* wirelessly. As is known, access point 370*d* operates to a certain range, which may generally allow other users to receive the signal of access point 370*d*. As explained above, the security of access point 370 may be set to allow no access, allow limited access, or allow all access, by the choice of the owner. When the owner registers access point 370*d* as member of the social network, the owner may specify the amount of bandwidth the owner is willing to allocate to third parties who are in the vicinity of the access point 370*d*. The owner may specify other parameters, such as access password, etc. When third parties connect to access point 370*d*, their client report connection data of access point 370*d* to the server 310. In this manner, relevant and updated information regarding access point 370*d* is stored in the database of server 310.

Conversely, when the owner of device 320 is away from its own access point 370*d*, the client of device 320 queries its database to determine which member's access point is available and at what connection quality. The client then connects the device 320 to the preferred access point. The client then sends connection information to the server 310 to update its database. In this manner, by agreeing to provide connectivity via its own access point, the user is able to obtain access to the network when the user is away from its own access point. That is, other members in the social network will allow the user to access the Internet via their access points. Moreover, a database is built which stores relevant and updated information regarding the location and quality of all members' access points. In this way, availability of radio access point is increased and connection to access points is improved.

FIG. 3 also depicts in the callout a feature of the invention wherein a geographical map is provided to device 320 to indicate locations having radio access point. As shown in the callout, a map of a delimited geographical area is depicted, and flags are used to indicate where radio access points are available. While flags are used in this example, any other shapes may be used. Additionally, according to a feature of the invention, the flags are colored in different colors according to their access quality. For example, the colors may change from green to red, wherein green is excellent access quality while red is poor. Additionally, or instead, numerical indication may be included in the flag to indicate the quality ranking of the access point. Both color and ranking may be used.

Moreover, the ranking may reflect both the quality of the access point in general, and the ranking of the access point with respect to the specific location the user is presently situated at. That is, access quality may change depending on the location of the mobile device with respect to the access point. However, location of mobile devices may be a repeatable event. For example, many users may frequent a specific restaurant or coffee shop. Therefore, it is very likely that previous users visited the same establishment and the client on their mobile device sent a report about the connectivity to the access point from that specific location. Thus, when the server determines the location of the mobile device of the user, the server may present a ranking of the access point with respect to the specific location of the mobile device.

Receiving ranking from many users about various AP's in the vicinity of the user may be very helpful in establishing a connection when many AP's are available. As experienced by many uses, when many access points are available, users generally simply try to connect to one after the other until success is achieved. However, if it is known beforehand that one specific point is available and is reliable, it would be more efficient to devote the efforts to connect to that specific AP. By having the ranking on the map, which may reflect reports from various other users, one is able to better select the AP to access. Furthermore, by having the map beforehand, one may chose one location over another. For example, one may prefer one coffee shop over another by noting on the map that one coffee shop is situated for better Internet access.

In one embodiment, where the system is implemented in the form of a social network, users may be able to also send comments on a specific AP in addition to the client's reports. In this manner, users are able to observe AP's rating generated from various clients' reports, and may also read comments of users. For example, if one specific commenter is known from experience to be reliable and write informative comments, it would make selecting the proper AP more easy and efficient by following his suggestions. According to one implementation, the comments may be accessible by clicking on the flag of a particular AP of interest or by simply positioning the mouse over it ("mouse over") so as to open a secondary window, as shown by the secondary callout in FIG. 3.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described methods and systems may be implemented in a wide variety of programming or scripting languages, such as Assembler, C/C++, perl, shell, PHP, Java, etc.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. Various aspects and/or components of the described embodiments may be used singly or in any combination in the plasma chamber arts. It is intended that the specification and examples be considered as exemplary only, with a true scope and spirit of the invention being indicated by the following claims.

The invention claimed is:

1. A method for improving user experience with a network-connected communications device comprising:
   measuring user experience with content applications operating on the device during connection of the device with at least one access point;
   developing a measurement report associated with a quality of the user experience;
   detecting with the device if there is a lull in communication between the device and one access point used for a current network connection;
   breaking a connection of the device with the one access point used for a current network connection when the lull in transmission activity is detected by the device;
   connecting the device to another access point other than the one used for the current network connection;
   developing another measurement report associated with a quality of the user experience; and
   transmitting the measurement reports wirelessly for receipt by a particular server.

2. The method of claim 1, wherein information in the measurement reports is based on operations of the device in communication with the access points.

3. The method of claim 1, wherein the measurement reports include information from one or more radio resource surveys.

4. The method of claim 3, wherein each radio resource survey uses information gathered from one or more measurement trips.

5. The method of claim 4, wherein select information in the measurement reports is discarded after expiration of time period.

6. A network-connected communications device comprising:
   a memory for storing instructions; and
   a processor for executing the stored instructions to:
      measure user experience with content applications operating on the device during connection of the device with at least one access point, develop a measurement report associated with a quality of the user experience, detect with the device if there is a lull in communication between the device and one access point used for a current network connection;

break a connection of the device with the one access point used for a current network connection when the lull in transmission activity is detected by the device, connect the device to another access point other than the one used for the current network connection, develop another measurement report associated with a quality of the user experience, and cause to transmit the measurement reports wirelessly for receipt by a particular server.

7. The communications device of claim 6, wherein information in the measurement reports is based on operations of the device in communication with the access points.

8. The communications device of claim 6, wherein the measurement reports include information from one or more radio resource surveys.

9. The communications device of claim 8, wherein each radio resource survey uses information gathered from one or more measurement trips.

10. The communications device of claim 9, wherein select information in the measurement reports is discarded after expiration of time period.

11. A method comprising:

receiving, from a set of mobile devices, measurement reports associated with quality of user experience during connection of at least one of the mobile devices with a set of network access points, including at least one measurement report generated by a mobile device that has detected a lull in communication between the mobile device and one network access point used for a current network connection, and broken the connection with the one network access point during the lull in transmission activity and connected with another network access point other than the one used by the mobile device for the current network connection; and generating a map comprising a set of network access point indicators, wherein each of the network access point indicators reflects an indication of a quality of connection associated with a corresponding one of the set of network access points.

12. The method of claim 11, wherein the measurement reports include information from one or more radio resource surveys.

13. The method of claim 12, wherein each radio resource survey uses information gathered from one or more measurement trips.

14. The method of claim 11, wherein the indication of the quality of connection is an indication of network bandwidth.

15. The method of claim 11, wherein the indication of the quality of connection is determined based on one or more of a received signal strength indication, a number-of occupied IP addresses, a data speed, a rate of connection drops, or a ping delay.

16. A server comprising:

a receiver configured to receive, from a set of mobile devices, measurement reports associated with quality of user experience during connection of at least one of the mobile devices with a set of network access points, including at least one measurement report generated by a mobile device that has detected a lull in communication between the mobile device and one network access point used for a current network connection, and broken connection with the network access point used for the current network connection during the lull in transmission activity and connected with another network access point other than the one used by the mobile device for the current network connection; and a processor configured to generate a map comprising a set of network access point indicators, Wherein each of the network access point indicators reflects an indication of a quality of connection associated with a corresponding one of the set of network access points.

17. The server of claim 16, wherein the measurement reports include information from one or more radio resource surveys.

18. The server of claim 17, wherein each radio resource survey uses information gathered from one or more measurement trips.

19. The server of claim 16, wherein the indication of the quality of connection is an indication of network bandwidth.

20. The server of claim 16, wherein the indication of the quality of connection is determined based on one or more of a received signal strength indication, a number of occupied IP addresses, a data speed, a rate of connection drops, or a ping delay.

* * * * *

UNITED STATES PATENT AND TRADEMARK OFFICE
CERTIFICATE OF CORRECTION

PATENT NO. : 10,045,238 B2  
APPLICATION NO. : 15/019690  
DATED : August 7, 2018  
INVENTOR(S) : Shimon Scherzer et al.

Page 1 of 1

It is certified that error appears in the above-identified patent and that said Letters Patent is hereby corrected as shown below:

In the Claims

Claim 16, Column 16, Line 28, "of network access point indicators, Wherein each of the" should read --of network access point indicators, wherein each of the--.

Signed and Sealed this
Twenty-fifth Day of September, 2018

Andrei Iancu
*Director of the United States Patent and Trademark Office*